Figure 1:
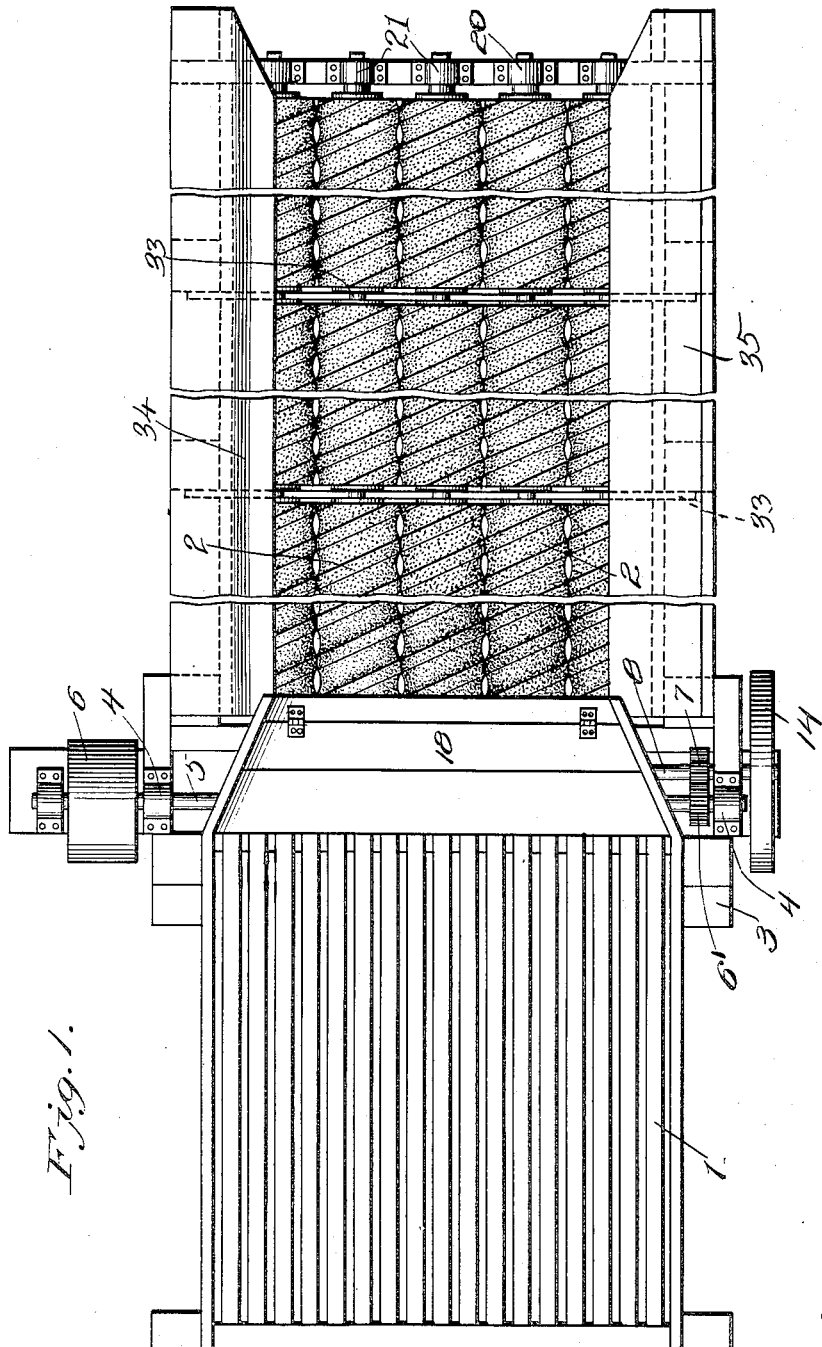

E. D. HOWARD.
FRUIT CLEANING MACHINE.
APPLICATION FILED NOV. 23, 1909.

1,025,062.

Patented Apr. 30, 1912.
3 SHEETS—SHEET 1.

Witnesses
Edwin F. McKee
Wm. J. Koerth

Inventor
Eugene D. Howard
By Victor J. Evans
Attorney

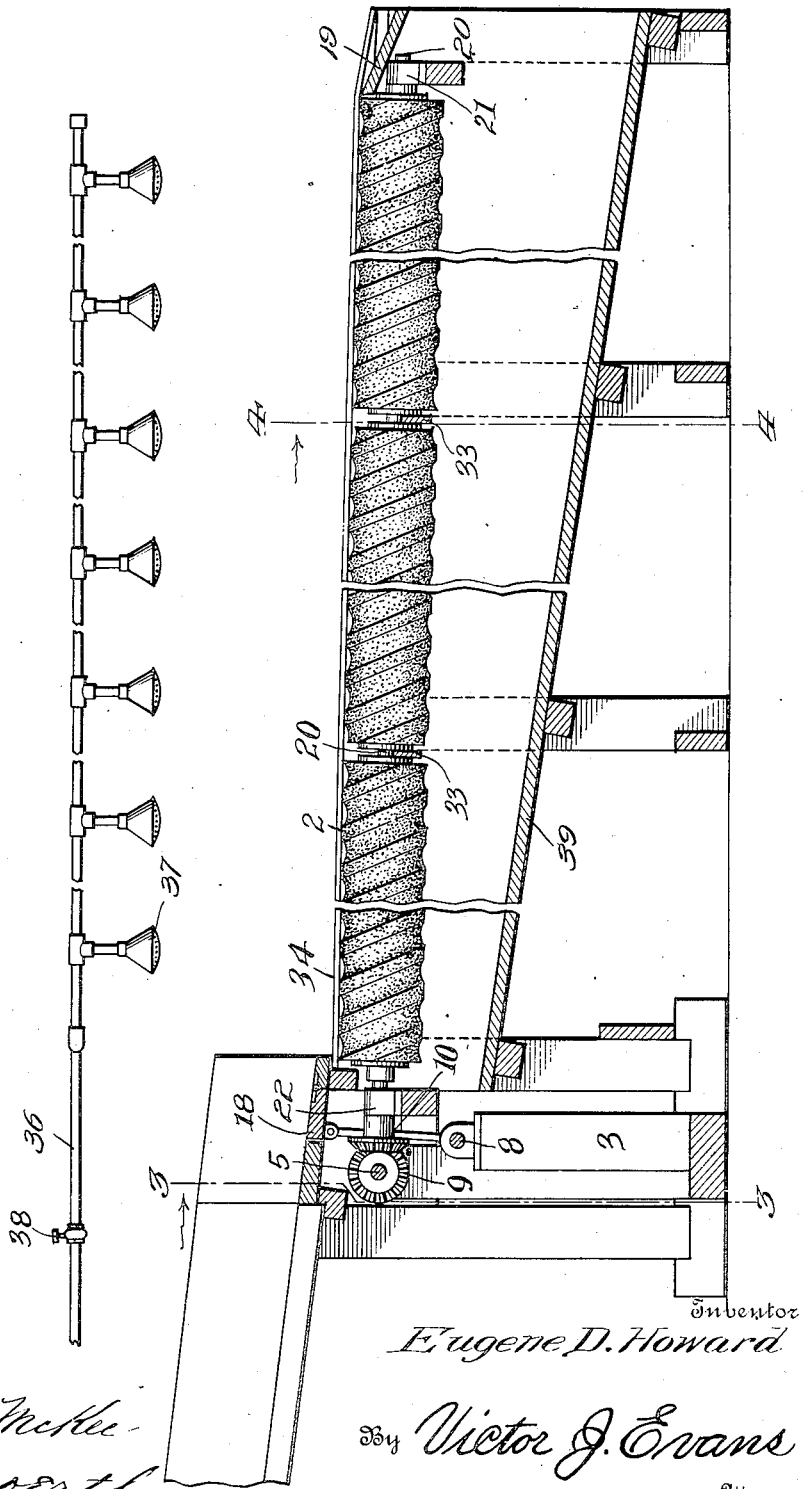

E. D. HOWARD.
FRUIT CLEANING MACHINE.
APPLICATION FILED NOV. 23, 1909.
1,025,062.
Patented Apr. 30, 1912.
3 SHEETS—SHEET 3.
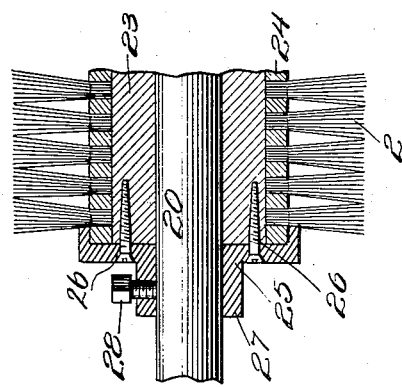
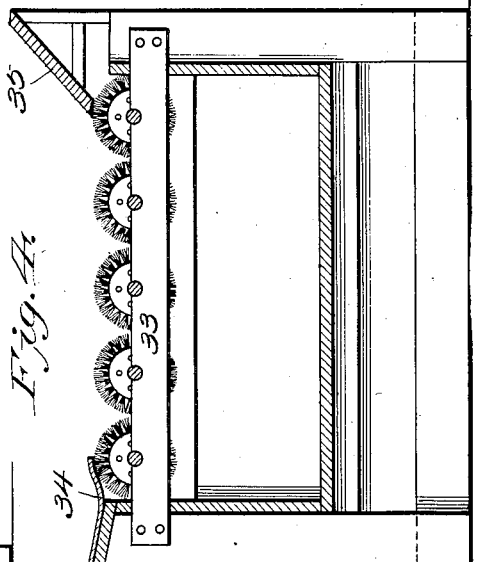
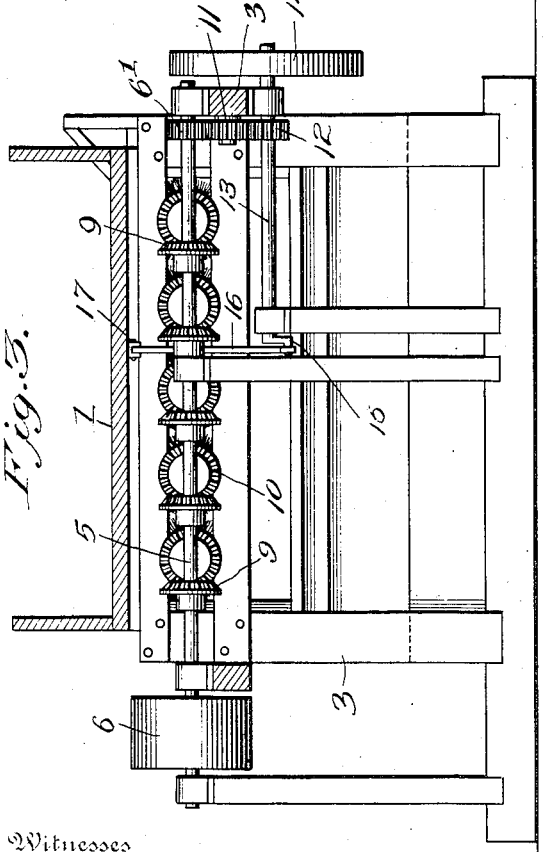
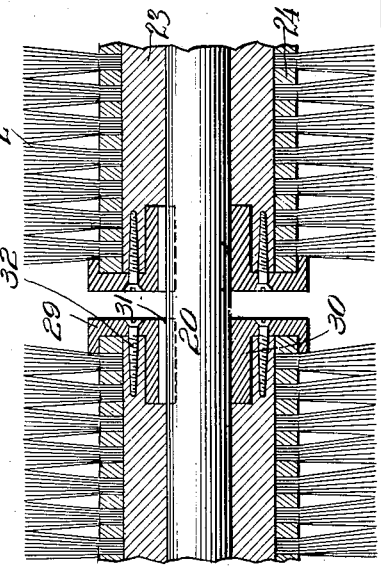

UNITED STATES PATENT OFFICE.

EUGENE D. HOWARD, OF DUARTE, CALIFORNIA.

FRUIT-CLEANING MACHINE.

1,025,062.  Specification of Letters Patent.  Patented Apr. 30, 1912.

Application filed November 23, 1909. Serial No. 529,644.

*To all whom it may concern:*

Be it known that I, EUGENE D. HOWARD, a citizen of the United States, residing at Duarte, in the county of Los Angeles and State of California, have invented new and useful Improvements in Fruit-Cleaning Machines, of which the following is a specification.

This invention relates to an improvement in self-feeding machines for brushing, polishing and washing fruit or vegetables, and consists in the construction, combination and arrangement of devices hereinafter fully described and claimed.

The device is primarily intended for cleaning citrous fruit and the principal object of the invention is to provide means whereby the fruit may be automatically fed through an inclined chute upon a series of brushes, the brushes being of a peculiar formation, and arranged in series and also revolving in one direction whereby the fruit may be revolved from one brush toward the adjoining brush and all of the fruit being fed through the channels or concaves provided by the brushes toward and through the open end of the device, the fruit being treated to a spray of water at various intervals during its course of travel.

With the above objects in view, and others which will appear as the description progresses, the invention resides in the novel arrangement of parts and details of construction hereinafter fully described and claimed.

In the accompanying drawings there has been illustrated a simple and preferred embodiment of the improvement, and in which:—

Figure 1 is a top plan view of a machine constructed in accordance with the present invention. Fig. 2 is a central longitudinal sectional view of the same. Fig. 3 is a transverse sectional view upon the line 3—3 Fig. 2. Fig. 4 is a similar sectional view upon the line 4—4 Fig. 2. Fig. 5 is a detail illustrating the manner of connecting the end of the brush to its shaft. Fig. 6 is a similar sectional view illustrating the manner in which the adjacent brushes are secured to the same shaft.

In the accompanying drawings the numeral 1 designates a slatted chute upon which the fruit are first fed. This chute 1 is inclined and is provided with an open mouth positioned directly above a series of brushes and designated by the numeral 2. The device is mounted upon a suitable frame 3 which is also adapted for the reception of bearings 4 upon which a shaft 5 is mounted. The shaft 5 has one of its ends provided with a suitable belt wheel 6 whereby motion is imparted to the shaft 5, through any desired source of power. The opposite end of the shaft 5 is provided with a toothed wheel 6' which is adapted to mesh with a similar toothed wheel 7 mounted upon a second shaft 8 which also extends transversely of the device and which is mounted in suitable bearings carried by the frame 3. The shaft 8 is provided, directly below the mouth of the chute 1 with a plurality of beveled toothed wheels 9, each arranged in the same direction and which are adapted to mesh with the toothed wheels 10 carried by the longitudinally arranged brushes 2.

Meshing with the toothed wheel 7 is an idler toothed wheel 11 mounted upon an axle secured to the frame 3 and coacting with the idler 11 is a similar toothed wheel 12 provided upon a short shaft 13 extending transversely of the frame and having one of its ends provided with a driving wheel 14 and its opposite end offset to provide a crank arm 15. The crank arm 15 is adapted for the reception of a suitable link 16 which has its opposite end pivotally connected as at 17, to a transversely arranged, hinged stop member 18. By this arrangement, it will be noted that when the wheel 14 is revolved the stop 18 will at intervals be arranged above the plane of the chute 1 so as to retard the downward movement of the fruit upon the brushes 2. The brushes 2 are arranged in series, as clearly illustrated in Fig. 1 of the drawings and the said brushes are adapted to be positioned longitudinally one against the other. The brushes are arranged in a spiral formation, and it will be noted that both the enlarged and the depressed portions of each of the said brushes aline so as to produce substantially angular elevations and depressions, so that the fruit received in one of the depressions will follow the depressions of the remaining chutes until it is contacted by a suitable member, hereinafter to be described, and forced over the enlarged portion of the brush into the succeeding depression and this process is repeated until the fruit is forced over an inclined way designated by the numeral 19.

The numerals 20 designate the shafts upon which the brushes are mounted. These shafts extend longitudinally of the machine being mounted in suitable bearings 21 and 22 and being connected with the toothed wheels 10. Each of the brush members is provided with a core 23 preferably constructed of pine core and the said core has an outer facing of maple, as designated by the numeral 24, and within which the brushes 2 are secured. The maple coating 24 is arranged with spiral depressions so as to receive the Tampico fiber of which the brush proper is formed. The extreme end brush members are provided with a metallic collar 25 having a suitable flange whereby the same engages the maple coating 24 is arranged with spiral provided with openings adapted for the reception of threaded elements 26 adapted to enter the pine core 23. The said collar is also provided with a suitable boss or offset 27, having a threaded opening adapted for the reception of a threaded element 28, which bears directly upon the shaft 20. The intermediate brush sections as well as the opposite ends of the end brush sections are also provided with metallic collars 29. These collars have their outer extremities provided with offsets whereby they engage the outer coating 24 of the brush members and have their central portions provided with an inturned ring member 30 having a way adapted for the reception of a spline or key 31 provided upon the shaft 20. The faces of the members 29 are also provided with suitable openings adapted for the reception of threaded members 32 which are adapted to enter the pine core 23 and secure the said collars thereto. By reference to Fig. 5 of the drawings, it will be noted that the adjacent ends of the brushes are spaced a suitable distance apart and the shaft 20 between these spaces is adapted to be seated within a suitable bearing 33 arranged transversely of the frame. It will be further noted that these bearings 33 each comprise a substantially rectangular plate having its upper edge provided with a plurality of approximately semi-cylindrical depressions each being adapted for the reception of one of the shafts 20 and by this arrangement it will be noted that the dust or dirt from the fruit upon one of the series of brushes is not imparted to the adjacent series, but may be deposited between the spaced brushes. The inclined outlet or way 19 is positioned adjacent the top of the end series of brushes, and directly above the cross beam upon which the bearings 21 are positioned.

Extending longitudinally of the frame upon one of its sides, and adapted to partially overlie the end brushes adjacent its side of the frame is a guard member 34 while upon the opposite side of the frame and directly above and partially overlying the series of brushes upon that side of the frame is an inclined member 35, which also extends the entire longitudinal length of the brushes. It will be noted that when the fruit is moved toward the inclined board or member 35, through the medium of the brushes, the same will be forced upon the said inclined member and from thence forced back again upon the brushes, thus thoroughly revolving the fruit and effectively cleaning the same.

In order to moisten the fruit while being cleaned by the brushes 2, I have provided a water pipe 36 positioned directly above the said brushes. The pipe 36 is provided with a plurality of cone-shaped sprinkler members 37, each spaced a suitable distance away from the other but so arranged that a constant spray is projected upon the brushes. The flow of water may be regulated by a suitable valve not shown. By providing the sprinkling apparatus, it will be observed that the fruit is moistened to a certain extent so that the brushes may readily remove any hardened substance upon the fruit and so that the said fruit are not only brushed and polished but thoroughly washed before ejected through the way 19. The water from the sprinklers 37 is allowed to drip from the brushes 2 upon a downwardly inclined floor 39 provided upon the frame of the device.

Having thus described the invention, what I claim as new is:—

The combination in a fruit cleaning machine, of a feed chute, a frame adjacent the chute, a plurality of brushes journaled in said frame longitudinally thereof and in communication with the chute, each of said brushes including a plurality of spaced sections arranged in series, the brushes of each section being of spiral formation, the spirals of one section having direct communication with those of an adjacent section and forming passageways diagonally of the frame whereby the fruit may be conveyed from one brush to the other by way of the spiral sections of the brushes and in a direction diagonally of the machine, and a member arranged longitudinally of the frame and at one side of the brushes therein and inclined relatively thereto, said member being adapted to receive the fruit from each of the passageways formed by the spirals of the brushes and discharge the said fruit back upon the brushes so that the former may travel the full length of the machine, substantially as, and for the purpose, described.

In testimony whereof I affix my signature in presence of two witnesses.

EUGENE D. HOWARD.

Witnesses:
 FRANK FERGUSON,
 EMIL RAY.